Nov. 8, 1955    J. G. DIXON    2,722,856
ANNULAR SWEEP DRILL OR HOLE CUTTER
Filed April 9, 1953    2 Sheets-Sheet 1

A—A

Inventor. John George Dixon

A - A

Inventor John George Dixon.

United States Patent Office 2,722,856
Patented Nov. 8, 1955

2,722,856

ANNULAR SWEEP DRILL OR HOLE CUTTER

John G. Dixon, Newcastle upon Tyne, England

Application April 9, 1953, Serial No. 347,667

Claims priority, application Great Britain April 21, 1952

3 Claims. (Cl. 77—69)

The object of my invention is the provision of improved annular sweep drills or hole cutters, in which one or more teeth (the preferred arrangement has three teeth) are radially disposed in a body which is adapted for operation in known hand, bench, or the like, power or manually operated drilling or cutting machines and which are capable of cutting annular slots and holes, in wood, metal or other materials. To reduce the power necessary to drive this cutter, and to permit it to be used at maximum speed, the teeth are made of narrow section so that the width of the cut is reduced to a minimum. A backing piece is provided behind the tooth to give it support against the cutting force, the support being suitably proportioned to assist in swarf clearance and to be capable of following the tooth into the annular groove being cut, such that support against tooth breakage is maintained for the full extent of the operation.

It is further the object to develop and make this support proportioned to give a feed limiting feature which automatically ensures a selected limited feed rate in any one revolution. This gives distinct advantages over known types of shell cutters, and ring and cup type hole saw cutters, when using in portable and light types of drilling machines where the feed rate is dependent solely on the manual force exerted by the operator. It is still further the object to provide a tool as hereinbefore described, but in which the cutting teeth may be removable for ease of re-grinding and re-use, or replacement after useful life, in the same body.

It is still further the object to provide a cutter as hereinbefore described where the teeth and back supports are integral with or removably fixed to a carrier assembly which is arranged to slide in grooves or slots in the body such that it can be secured in selected positions for the purpose of drilling holes and/or slots of differing diameters.

Finally it is a further object that the features hereinbefore described be extended over a range of inserted teeth, annular sweep cutters which are either arranged for cutting a fixed diameter or are adjustable radially to provide cutting of differing diameters within the range of their adjustment.

Figure 1:
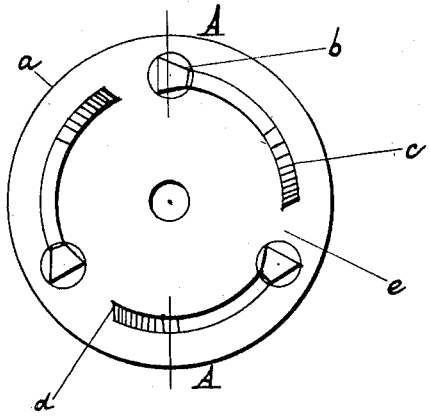
Figure 2:
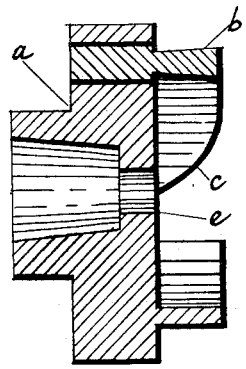
Figure 3:
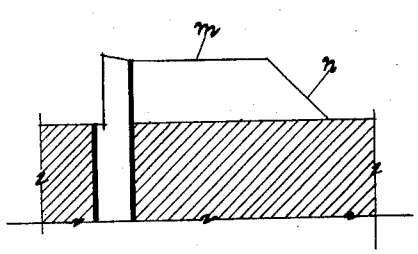
Figure 4:
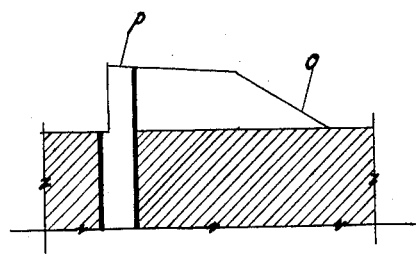
Figure 5:
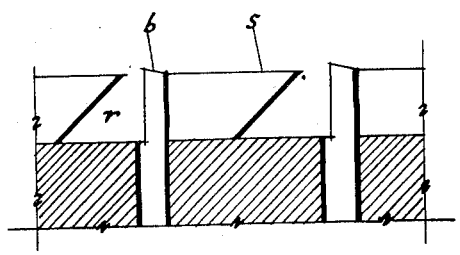
Figure 6:
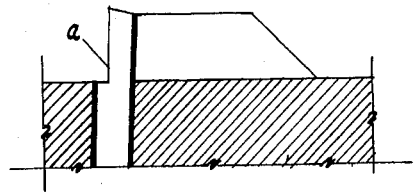
Figure 7:
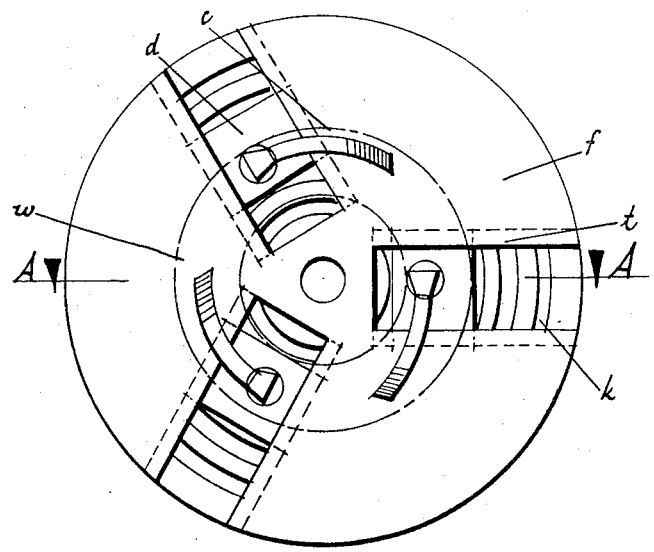
Figure 8:
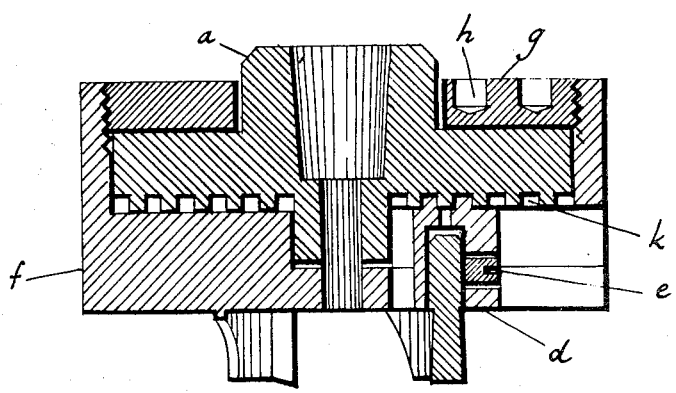

In order to render the subject of my invention more clearly, reference is made to the following drawings in which:

Fig. 1 is an end view of the cutting tool.
Fig. 2 is a section of Fig. 1 across a diameter.
Fig. 3 is a developed profile of one form of tooth back support.
Fig. 4 is a developed profile of another form of tooth back support.
Fig. 5 is a developed profile of yet a third form of tooth back support.
Fig. 6 is a developed view of yet another form of tooth back support, giving full limitations to feed rate.
Fig. 7 is an end view of an adjustable cutting tool.
Fig. 8 is a section through Fig. 7 on a diameter.
Figs. 1 and 2 illustrate one method of carrying this invention into effect and comprise a body $a$ rotatable about its longitudinal axis and with a cutting tooth or teeth $b$ integral with, or removably secured in one end of the body and rotatable thereby in an annular path concentric with the longitudinal axis. A projection or projections $c$ are provided integral with or removably secured to the body to provide back support for the teeth against the cutting force, these back supports being arranged to assist in chip or swarf clearance and to be capable of following the teeth into the annular slot being cut in order to maintain support to the tooth for the complete duration of the cutting operation.

The body $a$, Fig. 2, is provided with means (such as a twist drill, or pilot, or mandrel, or arbor provided with a pilot or pilot drill, or arbor with spring loaded centre) coaxially connected through the longitudinal axis or to that end of the body to which the cutting tooth or teeth are affixed and in advance of the teeth for the purpose of steadying the cutter and maintaining its path concentric with the centre of the hole or the like to be cut whilst advancing into the work.

Such a twist drill or pilot or mandrel or arbor having a solid or spring loaded pilot or pilot drill affixed, may be removably secured to the body $a$, Fig. 2, by any known method, such as a screw thread, taper hole, set screw, cotter, wedge or parallel hole with key way or the like.

The cutting teeth are made from or tipped with, any of the known types of cutting steels or materials and can be made of minimum size consistent with required strength, giving due consideration to the buttress against the cutting force which is offered by the back supports. Expensive tool steel requirements are thus made a minimum, and the body can be made cheaply from any of the steels or alloys which may be suitable and which offer economic advantages in manufacture technique. Good results in practice and great economic advantages are offered by the manufacture of the body as a pressure-die-casting in any of the alloys suitable for the purpose.

Where the tooth or teeth are provided to be integral with or fixed to the body, this may be carried out in a number of known ways such as:

I. Brazing or welding the cutting tooth or teeth into the body and/or onto a back support on the body.

II. Providing a cutting tooth or teeth with larger, or wedge, or dovetail shaped shanks opposite their cutting ends and/or serrations, grooves or steps on the tooth shank or sides, front and/or back and the insertion of such teeth into the die before casting such that the tooth becomes integral with the main body during casting.

III. Fixing the cutting tooth or teeth into the body by a wedge or cotter engaging the tooth shank or in a wedge or taper slot in the body so that the teeth be not readily removed.

In the preferred arrangement the cutting tooth or teeth may more readily be adaptable if fitted removable from the body in circular dovetail or shaped holes or slots provided in the side, end, or inside of the body and secured by set screws and/or removable wedges or cotters, bearing against a portion of the tooth or teeth shanks.

Alternatively the cutting tooth or teeth may be wedge shaped or have wedge shaped dovetail or other irregular formed shanks, to engage similar wedge or shaped holes or slots in the body and be removably secured therein by set screws and/or wedges or the like.

Alternatively the cutting tooth or teeth may be removably secured or integral with a back support which may be screwed or clamped to the body or otherwise wedge shaped or formed to engage in similar holes or slots in the body, and to be removably located therein by means of set screws and/or wedges or the like.

Alternatively the cutting tooth or teeth may be threaded to screw into the body, or attached to a back support arranged to screw into the body, and located radially by wedges, cotters, screws or the like, engaging suitable surfaces on the shanks of the cutting tooth or on the back support or both.

Finally the cutting teeth and/or back supports may be integral with or removably fixed to a carrier assembly which can be secured in suitable slots or holes in the body.

The back support or buttress c, Figs. 1 and 2, is proportioned so that it is accommodated in the annular grooves being cut and provides, by means of a curved or straight slope at the trailing section of the support, for the disposal of the chips or swarf from the cutting teeth. A suitable space e, Figs. 1 and 2, is preferably left between the trailing end of the support and the front of the following tooth, to provide accommodation for the chips which cannot get free when the teeth are advanced to nearly the full depth of their projection, and this prevents the cutter from jamming during the last stages of cutting a hole in the maximum thickness of the plate, or maximum depth of cut for which it has been designed. This feature may be further improved by having a shaped recess in the body substantially the length of the space e, Figs. 1 and 2, and arranging that this recess has side outlet so that disposal of the chips during the last stages of cutting to full depth are facilitated. A radial rake either outwards or inwards can be given to the back support to further assist in chip clearance; this rake is preferably arranged outwards as at d, Fig. 1, so that the chips are directed away from the hole or slot being cut. The back support depicted in Figs. 1 and 2 is shown in one form as a developed view in Fig. 4 and this may be in the form of a long, straight or curved rake, starting from the top or some distance below the back heel of the tooth and with the trailing section sloping or curving to join the contour of the body. In the preferred arrangement Fig. 4, it starts at approximately the same angle as the top rake of the cutting tooth at p, Fig. 4, and then curves or slopes at any suitable angle or curvature within the space available back to the face of the body of the tool, preferably leaving a space e, Fig. 1, and radial rake d to assist in chip clearance.

A further development of my invention is the shaping of this back support such that it gives a limiting feature to the rate at which the tool can be fed into the work. One form of achieving this object is shown in Fig. 3 where the support is given a flat section m, Fig. 3, parallel to the lateral face of the body of the cutter, and a straight or curved rake off n to where it joins the contour of the body. In the preferred arrangement, the flat top m, Fig. 3, is extended to just past the midway annular distance between the front cutting edge of one tooth and the tooth immediately following. The cutting edge of the tooth is arranged a limited distance in advance of the flap top m (preferably between .002 and .004 inch when cutting metals similar to mild steel) so that, due to the flat face of the back support coming into contact with the material being cut, the depth of cut (for an annular distance equal to the length of the flat top m) is limited to the amount of the selected projection of the tooth cutting edge. Taking an example of a cutter with three teeth where the tooth projection is .002 inch and the flat top m, Fig. 4, is half the annular distance between two successive tooth fronts, the mode of operation is as follows:

For the first 30 degrees of a revolution each tooth cuts a groove .002 inch maximum depth, at this point the flat top m can drop into the groove and for the next 30 degrees the depth of cut becomes a maximum of .004 inch. At this stage No. 2 tooth meets the .002 inch deep groove left by the first 30 degrees revolution of the No. 1 tooth, and since the flat top m is again ready to drop into the second 30 degrees groove, which is now .004 inch deep, the cut over the third 30 degrees is again a maximum of .004 inch. This sequence continues for the full extent of the drilling operation and the cut can at no time, under normal circumstances, be more than .004 inch deep. This development is of distinct advantage when using in light drilling machines as the fine feed provided by the arrangement allows higher cutting speeds; attempted heavy feeds can produce either audible warnings from the tool or else stalling of the drill due to the friction generated between the flat top m, Fig. 3, and the surface of the material being cut. The limitations of feed rate also considerably relieves the stress on the teeth and back supports, requires less power to drive the tool, allows higher cutting speeds and reduces chatter.

The maximum depth of cut provided by the feed limiting feature can be varied for different materials by the amount the teeth are adjusted in advance of the back support the teeth being adjusted to suitable gauges.

Further developments of my feed limiting features are as generally depicted in the developed side elevations of a back support shown in Fig. 5 where the flat top s is extended to nearly the maximum distance and swarf clearance and/or chip accommodation for the final stages of the cut is provided by the undercut portion r, Fig. 5, which may be of any suitable slope or curvature. In the case of single tooth cutters which may be preferred for cutting diameters under ¾ inch, the back support may be carried for nearly the full annular distance leaving a suitably shaped gap at the trailing edge for swarf clearance in front of the tooth in a similar manner to the methods herein before described. This back support also gives a bearing which helps to line up the tool to the correct cutting angle when using by hand in portable drilling machines.

The developments described may be further extended or adapted where provisions to reduce the effect of the cutting force on the teeth for specific reasons on various materials are desired. The cutting teeth shown at b, Fig. 2, may be given positive or negative front rake and forward or backward rake relative to the longitudinal axis of the body can be further provided when required by arranging the teeth as in a and b, Fig. 6, and producing a corresponding contacting surface on the leading face of the back support generally as illustrated in Fig. 6.

The cutting teeth in the case of a multiple tooth cutter may be symmetrically spaced on a given circle on the main body as shown in Fig. 1, or be given different or unequal spacing about such a circle which has the effect of increasing the feed limiting features when used with support. Fig. 3.

Should it be so desired the back support can be removably fixed or integral with a separate tooth carrier assembly and this carrier assembly arranged to be fixed or clamped in slots or holes at fixed or differing diameters on the same body. This development is further extended by arranging that the tooth and back support carrier is adjustable for differing diameters by proportioning the carrier such that it can slide in radial slots in the body, these slots being provided with undercut, veed or keyway sides, the mode of operation being by known methods such as cam slots, scroll threads, taper cones and the like.

This development when considering the tooth back supports depicted in Figs. 3 and 4 which have their walls substantially concentric about the longitudinal axis of the body as shown in c, Fig. 1, causes serious limitations in the case of a tool assembly which is adaptable for cutting differing diameters, as the required radii of the walls of the back support are different for the various diameters being cut. This can be overcome by arranging that the tooth width is increased such that the annular groove is sufficiently wide to accommodate a fixed radius back support at differing cutting diameters.

This limitation leads to the final development where a number of tooth carriers with removably fixed or integral back supports are arranged to be adjustably operated or fixed each at a slightly different radius in the body such that the annular grooves produced by the teeth slightly overlap or meet, to form a substantially wide annular groove. The radii of the back support walls may not then be concentric with the longitudinal axis of the body but arranged to slope inwards in the case of the outside tooth, and outwards in the case of the most inner tooth, such that at all times they can be accommodated in the total width of the annular groove produced by the combined effect of all the teeth. This arrangement provides that the teeth need be no wider and that the material removed per revolution is no more than that of the fixed diameter cutter and the advantages of the back support and/or the feed limiting features hereinbefore described can now be fully extended to the case of an adjustable cutter; the only disadvantage is that the rate of penetration of the cutter per revolution, is less, in direct proportion to the number of teeth provided.

Figs. 7 and 8 show one method of carrying this invention into effect with reference to the developments mentioned in the prior three paragraphs, wherein the back support or supports are removably fixed or integral with a tooth carrier assembly *d*, Figs. 7 and 8, which is arranged to slide in radial slots *t*, Fig. 7, provided in the front plate *f*, Fig. 7, the radial slots being provided with undercut, V-form or keyway sides such that the carrier assembly is supported against the cutting force.

The cutting tooth or teeth are clamped in the carrier pieces *d*, Figs. 7 and 8, by means of screws, wedges, cotters or the like as depicted at *e*, Fig. 8. The back of the carrier is arranged with suitable part threads which run in a scroll threaded adjusting plate *a*, Fig. 8, and relative movement of this plate, with reference to the front plate *f*, provides simultaneous adjustment to the carriers in a similar manner to known principles as used on self-centering lathe chucks. The scroll thread *k*, Figs. 7 and 8, is of square, Acme, or other known form and is machined or cast in the front of the back plate *a*, Fig. 8.

The teeth and back support carriers are fitted in the scroll plate, such that they have a small radial disposition from each other, the annular path cut by each tooth being arranged to overlap or combine to give a wider path. The back supports *c*, Fig. 7, are disposed such that they can be accommodated in this combined path at all times within the range of their adjustment. The combined annular path of the three teeth for the radial setting shown is depicted in chain dotted lines at *w*, Fig. 7.

The front plate *f*, Figs. 7 and 8, is provided with means such as a clamping ring or nut on the front face, clamping screws or wedges, or locking plate *g*, Fig. 8, such that it can be clamped down to the back plate to fix the tooth carriers *d* in the desired positions.

By freeing this clamping arrangement the front plate is rotated relative to the back plate and the tooth and back support carriers, while maintaining their relative radial dispositions, adjust equally radially under the action of the scroll thread. Retightening the locking plate *g*, Fig. 8, then fixes the teeth in the desired positions.

Any of the suitable faces on the assembly may be scribed or marked such that indication of the size of hole or annular slot may be determined when setting the cutters, and the various parts may be provided with holes or slots as at *h*, Fig. 8, such that they may be operated by keys, toggle rods or bars, spanners or the like.

Alternatively the scroll may be operated by a geared pinion operating on a geared ring integral with the scroll back plate *a*, Fig. 8, by means of an external key as in known methods for self-centering lathe chucks or, alternatively, the scroll back plate and the front plate *f*, Fig. 8, may be given relative movement by the operation of a geared key, bearing on an integral geared ring, affixed to either the scroll back plate or the front plate as in known methods used on geared self-centering drill chucks.

The mode of operation of the cutters as herein before described is that the complete assembly has incorporated, or is removably fixed to, a pilot/arbor which has a shank of suitable shape for fixing in standard chucks or spindles of drilling and cutting machines. The pilot is preferably in the form of a drill set slightly in advance of the cutting teeth such that it drills its own pilot hole and maintains the cutter steady and concentric with the required centre of the hole being drilled. After suitable penetration of the pilot, the teeth of the cutter then cut an annular groove equal to their width, or combined width, and the back supports follow the teeth into this annular groove and thus maintain support for the extent of the operation. When the tool is being used to cut a hole, the annular groove is continued in depth until it passes completely through the thickness of the material thus leaving a hole with a diameter equal to the outside diameter of the cutting edges of the teeth. Where the thickness of the material is more than the projection of the teeth, the operation can be carried out from both sides, such that the annular groove meets in the centre or body of the material, in this case the pilot drill is arranged a suitable distance in advance of the teeth, or else a previously prepared pilot hole completely through the thickness of the material is utilised.

It is appreciated that in the interests of economy it is standard practice on larger types of milling cutters used for surface machining by means of a traversing action, to insert or fix cutting teeth into a body made from some suitable cheaper material and that in some cases, some form of buttress or part support to the teeth is given by the profile of the body, the claims of this invention, therefore, do not cover broadly the aspects of milling cutters which have inserted teeth and back support to their teeth, but are confined to annular slot and/or hole cutters where comparatively narrow teeth are arranged with a back support proportioned to pass into the annular groove and which provide facilities for chip clearance and/or limitations to feed rate.

Having now described and ascertained the nature of my invention, the manner in which it is to be performed, the mode of operation and scope to which I lay claim, I declare that my specific claims are:

I claim:

1. An annular hole cutter comprising a body with means for fitting to a shank with pilot, buttresses projecting forwardly from the face of the body, apertures in the body registering with the forward edges of the buttresses, removable cutting teeth with forward cutting edges wider than the buttresses, projecting from said apertures, a periphery flange on the body radially external to the buttresses and tooth apertures, tapped holes and set screws in side of said flange locating with the teeth shanks in said apertures, the trailing ends of said buttresses being sloped back to the body face providing a space to permit escape of cuttings, for the purpose set forth.

2. An annular hole cutter comprising a body with means for fitting to a shank with pilot, buttresses projecting forwardly from the face of the body, round apertures in the body registering with the forward edges of the buttresses, removable cutting teeth ground from suitable round stock, projecting from said round apertures, said cutting teeth having cutting faces wider than said buttresses and a locating flat on the outer diameter of the tooth root, a periphery flange on the body radially external to the buttresses and tooth apertures, tapped holes and set screws in side of said flange to locate on the locating flats of the tooth roots, angle of said tapped holes and set screws being suitably arranged for different sizes to locate standard form teeth radially, to line the tooth heels with their buttresses, the trailing ends of said buttresses being sloped back to the body face to provide a space to permit escape of cuttings.

3. An annular hole cutter comprising a body with means for fitting to a shank with pilot, buttresses projecting forwardly from the face of the body, forward edges of said buttresses being parallel to the face of the body to provide a feed limiting bearing surface, apertures in the body registering with the forward edges of the buttresses, removable cutting teeth with forward cutting edges wider than the buttresses projecting from said apertures, said teeth being adjustable forwardly to vary the feed depth limitation with respect to said forward parallel edges of buttresses, a periphery flange on the body radially external to the buttresses and tooth apertures, tapped holes and set screws in side of said flange, locating with the teeth shanks in said apertures, the trailing ends of said buttresses being sloped back from the said buttress parallel forward faces, to meet with the body face and provide a space to permit escape of cutting.

References Cited in the file of this patent

UNITED STATES PATENTS

| | | |
|---|---|---|
| 687,724 | Cadell | Dec. 3, 1901 |
| 1,150,555 | Thau | Aug. 17, 1915 |
| 1,434,995 | Francis | Nov. 7, 1922 |
| 1,436,974 | Michalczyk | Nov. 28, 1922 |
| 1,603,359 | Schneckloth | Oct. 19, 1926 |

FOREIGN PATENTS

| | | |
|---|---|---|
| 383,221 | Germany | Oct. 11, 1923 |